US008662727B2

(12) United States Patent
Kanade et al.

(10) Patent No.: US 8,662,727 B2
(45) Date of Patent: Mar. 4, 2014

(54) APPARATUS FOR EFFICIENTLY COUPLING LIGHT FROM A LIGHT SOURCE INTO A THIN OBJECT

(75) Inventors: Udayan Kanade, Pune (IN); Pushkar Apte, Rochester, NY (US); Ruby Rama Praveen, Pune (IN); Sanat Ganu, Pune (IN); Sumeet Katariya, Pune (IN); Alok Deshpande, Madison, WI (US); Parag Khairnar, Bengaluru (IN)

(73) Assignee: I2iC Corporation, Foster City, CA (US)

( * ) Notice: Subject to any disclaimer, the term of this patent is extended or adjusted under 35 U.S.C. 154(b) by 424 days.

(21) Appl. No.: 12/933,430

(22) PCT Filed: Mar. 19, 2009

(86) PCT No.: PCT/IB2009/051169
§ 371 (c)(1),
(2), (4) Date: Sep. 20, 2010

(87) PCT Pub. No.: WO2009/116011
PCT Pub. Date: Sep. 24, 2009

(65) Prior Publication Data
US 2011/0013418 A1    Jan. 20, 2011

(30) Foreign Application Priority Data

Mar. 19, 2008    (IN) .......................... 552/MUM/2008

(51) Int. Cl.
*F21V 7/04*    (2006.01)

(52) U.S. Cl.
USPC ............ 362/610; 349/65; 362/606; 362/608; 362/611

(58) Field of Classification Search
USPC ................. 362/606, 610, 611, 608; 349/65
See application file for complete search history.

(56) References Cited

U.S. PATENT DOCUMENTS

| 5,940,571 | A | 8/1999 | Masaki |
| 6,164,789 | A * | 12/2000 | Unger et al. .................. 362/610 |
| 7,139,464 | B2 | 11/2006 | Matsumoto et al. |
| 7,284,892 | B2 * | 10/2007 | Kitamura et al. ............. 362/610 |
| 2007/0081360 | A1 * | 4/2007 | Bailey et al. .................. 362/610 |

OTHER PUBLICATIONS

PCT Search report i.e. PCT document PCT/ISA/210 for PCT/IB2009/051169 dated Jun. 30, 2009.

* cited by examiner

*Primary Examiner* — Stephen F Husar

(57) ABSTRACT

An apparatus for efficiently coupling light from a light source into a thin object such as a rod or a sheet is disclosed. In an embodiment, the apparatus comprises a sheet and a linear light source placed along the edge of the sheet. The light from linear light source is coupled into the sheet using one or more concentrator blocks. In another embodiment, the apparatus comprises a rod and a point light source placed near one end of the rod. The light from point light source is coupled into the rod using one or more concentrator blocks.

8 Claims, 9 Drawing Sheets

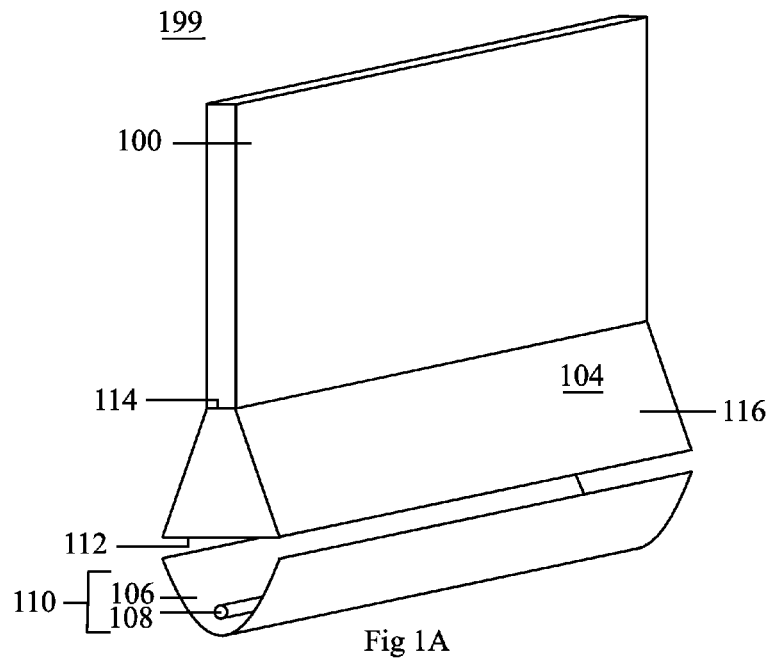
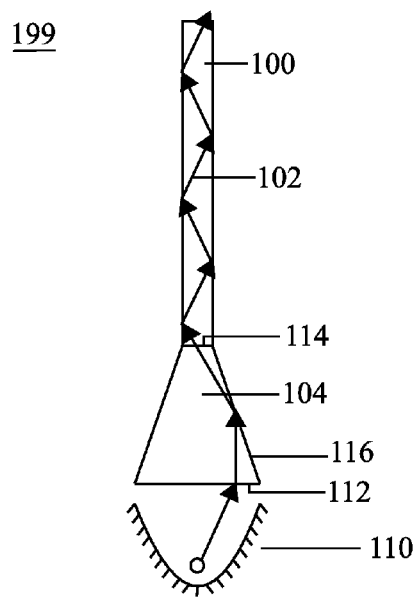

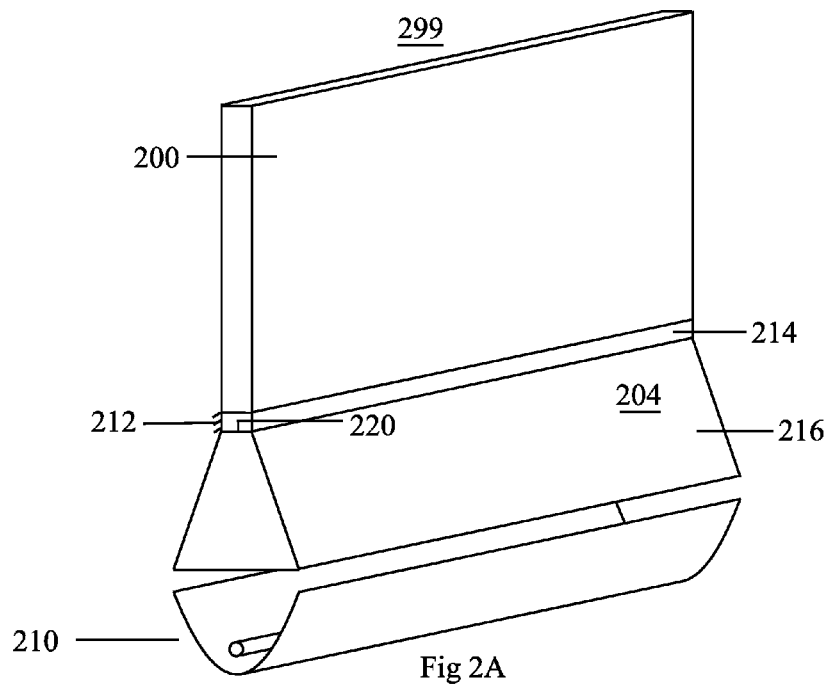
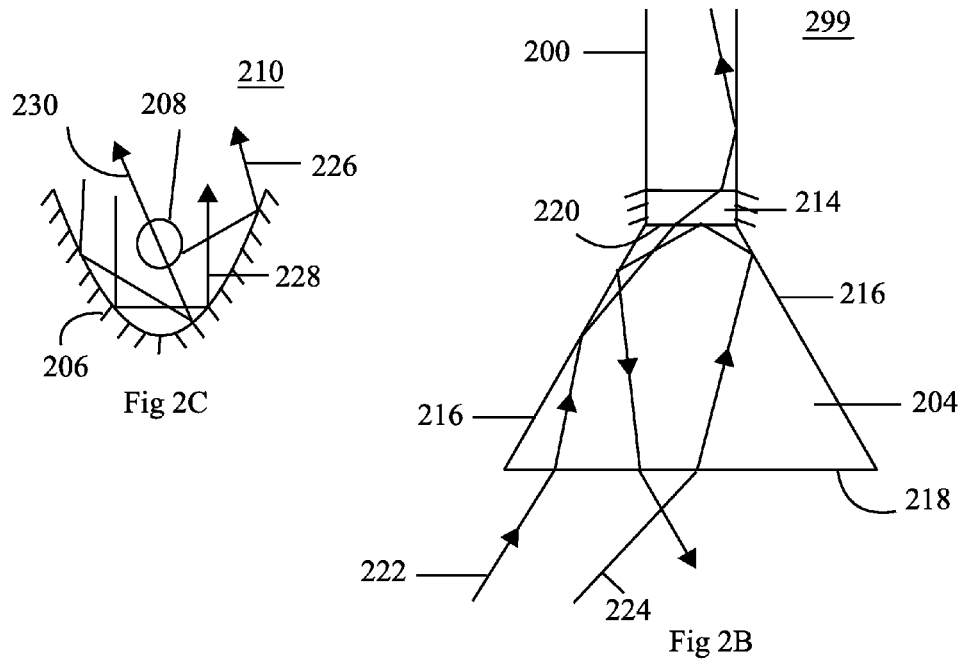

APPARATUS FOR EFFICIENTLY COUPLING LIGHT FROM A LIGHT SOURCE INTO A THIN OBJECT

This invention claims priority from provisional patent number 552/MUM/2008 titled "Apparatus for Efficiently Coupling Light from a Light Source into a Thin Object" filed on 19 Mar. 2008 in Mumbai, India.

TECHNICAL FIELD

The present invention relates to an apparatus for efficiently coupling light from a light source into a thin object such as a rod or a sheet.

BACKGROUND ART

Illumination is used to light objects for seeing, as also for photography, microscopy, scientific purposes, entertainment productions (including theater, television and movies), projection of images and as backlights of displays. Backlights of displays include light conducting sheets into which light is coupled from linear light sources (such as CCFL tubes) placed along one or more edges. For increasing the overall energy efficiency of backlight, there is a need for efficient optical coupling between sheet and linear light source. There is a need for thin backlights for reducing the size of displays.

Linear light guides carrying light are used in illumination applications and communication applications. There is a need for efficient optical coupling between linear light guide (such as optical fiber) and point light source (such as LED or LASER). In the present art focusing lenses are used to couple light sources to optical fibers.

DISCLOSURE OF INVENTION

Summary

An apparatus for efficiently coupling light from a light source into a thin object such as a rod or a sheet is disclosed. In an embodiment, the apparatus comprises a sheet and a linear light source placed along the edge of the sheet. The light from linear light source is coupled into the sheet using one or more concentrator blocks. In another embodiment, the apparatus comprises a rod and a point light source placed near one end of the rod. The light from point light source is coupled into the rod using one or more concentrator blocks.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 1A illustrates an apparatus for efficiently coupling light from a linear light source into a sheet light guide, according to an embodiment.

FIG. 1B illustrates an apparatus for efficiently coupling light from a linear light source into a sheet light guide as seen from the side, according to an embodiment.

FIG. 2A illustrates an apparatus for efficiently coupling light from a linear light source into a sheet light guide, according to an embodiment.

FIG. 2B illustrates a partial detailed view of apparatus for efficiently coupling light from a linear light source into a sheet light guide, as seen from the side, according to an embodiment.

FIG. 2C illustrates a linear light source, as seen from the side, according to an embodiment.

DETAILED DESCRIPTION

Figure 3:
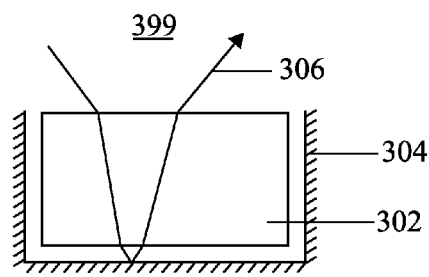
FIG. 3 illustrates a linear light source, as seen from the side, according to an embodiment.

An apparatus for efficiently coupling light from a light source into a thin object such as a rod or a sheet is disclosed. In an embodiment, the apparatus comprises a sheet and a linear light source placed along the first edge of the sheet. The light from linear light source is coupled into the sheet using one or more concentrator blocks. In another embodiment, the apparatus comprises a rod and a point light source placed near one end of the rod. The light from point light source is coupled into the rod using one or more concentrator blocks.

GLOSSARY OF TERMS

A reflector is any means of reflecting light. Specular light reflectors or mirrors include metallic surfaces, distributed Bragg reflectors, hybrid reflectors, total internal reflectors or omni-directional reflectors. Diffuse light reflectors include paints, suspensions of transparent materials, dyes, etc.

A point light source is a light source emitting light from a small region. E.g. an LED (Light Emitting Diode), a LASER (Light Amplification by Stimulated Emission of Radiation) or a filament can act as a point light source. A small linear or surface light source (described below) can also be considered to be a point light source when viewed from afar, or when emitting light into a much larger body.

A linear light source is a light source emitting light from a region which has one large dimension. A linear light source could be shaped like a tube with circular, square or other cross section, for example. a bank of LEDs, a fluorescent tube.

A surface light source is a light source emitting light from a region which has two large dimensions. A surface light source will have at least one large light emitting surface. It may have a small thickness, i.e. it may be in the form of a sheet.

A light guide is an object which guides light within it. It may use total internal reflection, or other means of conducting light.

A linear light guide is a light guide with one large dimension.

A sheet light guide is a light guide with two large dimensions.

Description of Figures

FIG. 1A illustrates an apparatus 199 for efficiently coupling light from a linear light source 110 into a sheet light guide 100, according to an embodiment. Coupling block 104 is a transparent body having a light entry face 112, a light exit face 114 and at least one light guiding face 116, the light entry face 112 being larger than the light exit face 114. The linear light source 110 is situated adjacent to the light entry face 112. The sheet light guide 100 is situated adjacent to the light exit face 114. The light guiding face 116 reflects light hitting it from inside the coupling block 104 by total internal reflection. In an embodiment, the light guiding face 116 is planar. In an embodiment, the light guiding face 116 is a reflector, which reflects light hitting it from inside the coupling block 104. In an embodiment, the linear light source 110 comprises a linear light source 108 and a reflector 106 which directs the light towards the first face 112.

FIG. 1B illustrates an apparatus 199 for efficiently coupling light from a linear light source 110 into a sheet light guide 100 as seen from the side, according to an embodiment.

An exemplary ray of light 102 enters the coupling block 104 from linear light source 110 via the light entry face 112. It optionally hits the one or more light guiding faces 116 at one or more points and gets reflected by means of reflection or total internal reflection. Eventually, it exits towards the sheet light guide 100 through the light exit face 114.

Thus, light from a light source is coupled efficiently into a thin light guide. A thin sheet light guide may be used as a surface light source, with the inclusion of light deflecting means such as geometric shapes, dyes, etching, particles, etc. Thus a thin surface light source is achieved, which is beneficial as a backlight for transmissive displays.

FIG. 2A illustrates an apparatus 299 for efficiently coupling light from a linear light source 210 into a sheet light guide 200, according to an embodiment. A transparent body 214 is situated between the light exit face 220 of coupling block 204 and the sheet light guide 200. In an embodiment, the transparent body 214 has a refractive index lower than either the coupling block 204 or the sheet light guide 200 or both. A transparent body of lower refractive index may be a solid, a liquid, a gas such as air, or vacuum. In an embodiment, a reflector 212 is situated outside the transparent body 214, and contains light within the transparent body 214.

FIG. 2B illustrates a partial detailed view of apparatus 299 for efficiently coupling light from a linear light source into a sheet light guide 200, as seen from the side, according to an embodiment. An exemplary ray of light 222 bends towards the normal while entering the coupling block 204. This bending towards the normal makes it more vertical, and allows it to be conducted by repeated reflections at the one or more light guiding faces 216 to the light exit face 220. It then enters the transparent body 214 and finally enters the light guide 200. In an embodiment, the transparent body 214 has a lower refractive index than the sheet light guide 200, and thus the ray of light 222 bends towards the normal while passing into the sheet light guide 200, allowing it to be guided by the sheet light guide 200.

In an embodiment, the transparent body 214 has a lower refractive index than the coupling block 204, and thus, some light is reflected by total internal reflection at the light exit face 220 and may travel back to the light entry face 218, as illustrated by exemplary light ray 224. Even without the transparent body 214, some light entering the light entry face 218 may eventually travel back to it, instead of reaching the light exit face 220. In an embodiment, such light exiting the light entry face 218 is reflected back towards the coupling block 204 by a reflector. Such a reflector may be included as a part of the linear light source situated adjacent to the light entry face 218.

FIG. 2C illustrates a linear light source 210, as seen from the side, according to an embodiment. The linear light source 210 comprises a linear light source 208 and a reflector 206. The reflector 206 directs the light from the linear light source 210 towards the light entry face of the coupling block, as illustrated by exemplary light ray 226. The reflector 206 also reflects light exiting the light entry face back into the light entry face, as illustrated by exemplary light ray 228. In an embodiment, the linear light source 208 is transparent to light entering it from outside, and thus light exiting the light entry face is sent back into the light entry face even if it hits the linear light source 208, as illustrated by exemplary light ray 230.

FIG. 3 illustrates a linear light source 399, as seen from the side, according to an embodiment. A linear light source 302 is placed in a reflector 304. The linear light source 302 is substantially transparent to light entering from outside. In an embodiment, there is very little or no gap between the linear light source 302 and the reflector 304, and yet light exiting the light entry face of a coupling block placed adjacent to the linear light source 399 is sent back into the light entry face as illustrated by exemplary light ray 306 which traverses the substantially transparent linear light source 302 and is reflected by the reflector 304. Since the reflector 304 can be placed tightly around the linear light source 302, this reduces the size of the apparatus, thus reducing the size of the light entry face of the coupling block adjacent to it, thus reducing the size of the light exit face of the coupling block, thus reducing the size of the light guide into which the light is coupled.

Figure 4A:
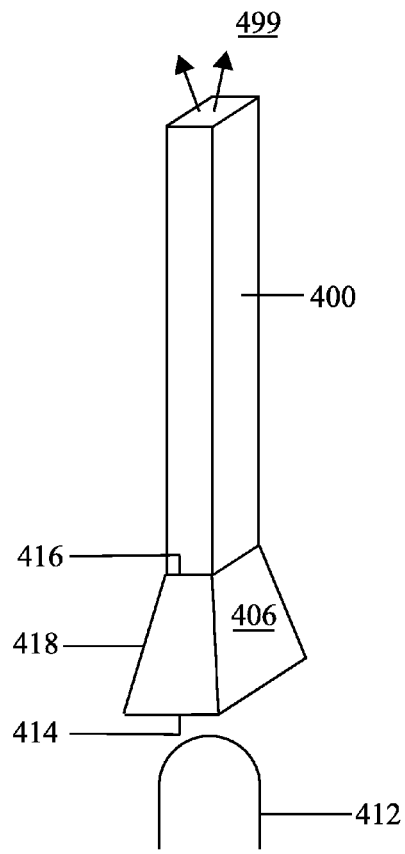
FIG. 4A illustrates an apparatus for efficiently coupling light from a point light source into a linear light guide, according to an embodiment.

FIG. 4A illustrates an apparatus 499 for efficiently coupling light from a point light source 412 into a linear light guide 400, according to an embodiment. Coupling block 406 is a transparent body having a light entry face 414, a light exit face 416 and at least one light guiding face 418, the light entry face 414 being larger than the light exit face 416. The point light source 412 is situated adjacent to the light entry face 414. The linear light guide 400 is situated adjacent to the light exit face 416. The light guiding face 418 reflects light hitting it from inside the coupling block 406 by total internal reflection. In an embodiment, the light guiding face 418 is planar. In an embodiment, the light guiding face 418 is a reflector, which reflects light hitting it from inside the coupling block 406.

Figure 4B:
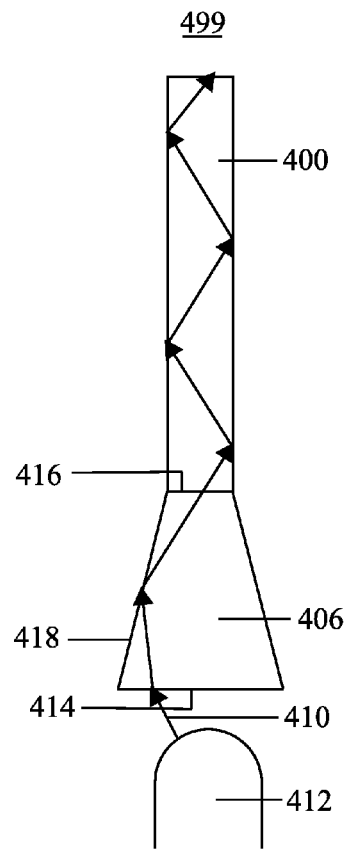
FIG. 4B illustrates an apparatus for efficiently coupling light from a point light source into a linear light guide as seen from the side, according to an embodiment.

FIG. 4B illustrates an apparatus 499 for efficiently coupling light from a point light source 412 into a linear light guide 400 as seen from the side, according to an embodiment. An exemplary ray of light 410 enters the coupling block 406 from point light source 412 via the light entry face 414. It optionally hits the one or more light guiding faces 418 at one or more points and gets reflected by means of reflection or total internal reflection. Eventually, it exits towards the linear light guide 400 through the light exit face 416.

Thus, light from a light source is coupled efficiently into a thin light guide. A thin linear light guide may be used as a linear light source, with the inclusion of light deflecting means such as geometric shapes, dyes, etching, particles, etc. Thus a thin linear light source is achieved, which is beneficial as a light source for a thin sheet light guide.

Figure 5A:
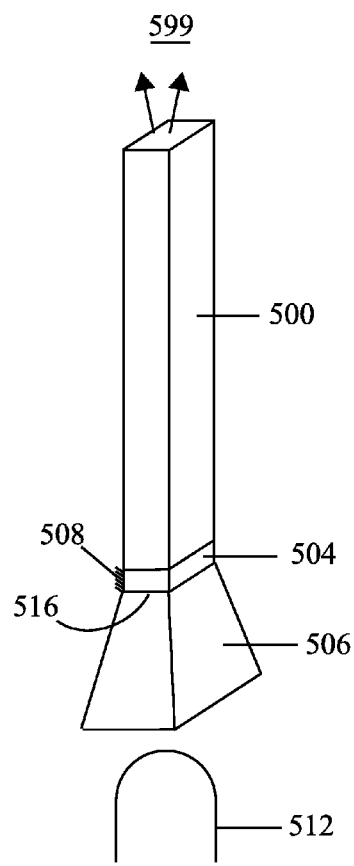
FIG. 5A illustrates an apparatus for efficiently coupling light from a point light source into a linear light guide, according to an embodiment.

FIG. 5A illustrates an apparatus 599 for efficiently coupling light from a point light source 512 into a linear light guide 500, according to an embodiment. A transparent body 504 is situated between the light exit face 516 of coupling block 506 and the linear light guide 500. In an embodiment, the transparent body 504 has a refractive index lower than either the coupling block 506 or the linear light guide 500 or both. A transparent body of lower refractive index may be a solid, a liquid, a gas such as air, or vacuum. In an embodiment, a reflector 508 is situated outside the transparent body 504, and contains light within the transparent body 504.

Figure 5B:
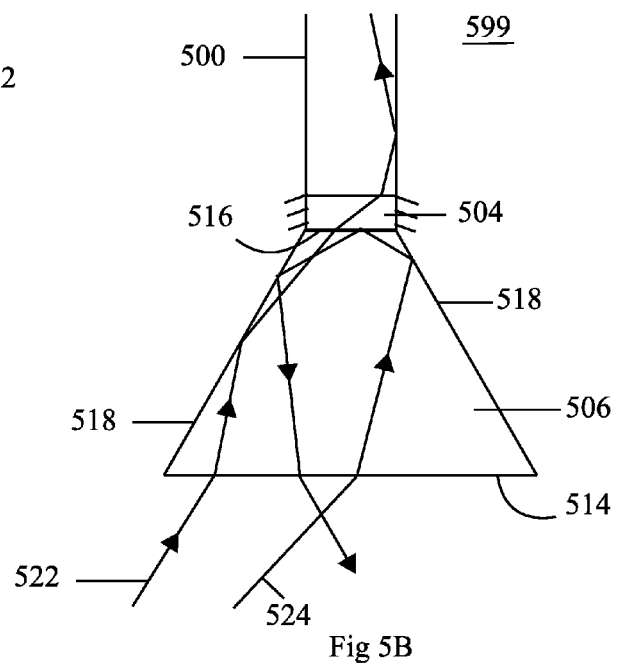
FIG. 5B illustrates a partial detailed view of apparatus for efficiently coupling light from a point light source into a linear light guide, as seen from the side, according to an embodiment.

FIG. 5B illustrates a partial detailed view of apparatus 599 for efficiently coupling light from a point light source into a linear light guide 500, as seen from the side, according to an embodiment. An exemplary ray of light 522 bends towards the normal while entering the coupling block 506. This bending towards the normal makes it more vertical, and allows it to be conducted by repeated reflections at one or more light guiding faces 518 to the light exit face 516. It then enters the transparent body 504 and finally enters the light guide 500. In an embodiment, the transparent body 504 has a lower refractive index than the linear light guide 500, and thus the ray of light 522 bends towards the normal while passing into the linear light guide 500, allowing it to be guided by the linear light guide 500.

In an embodiment, the transparent body 504 has a lower refractive index than the coupling block 506, and thus, some light is reflected by total internal reflection at the light exit face 516 and may travel back to the light entry face 514, as illustrated by exemplary light ray 524. Even without the transparent body 504, some light entering the light entry face 514 may eventually travel back to it, instead of reaching the light exit face 516. In an embodiment, such light exiting the light entry face 514 is reflected back towards the coupling block 506 by a reflector. Such a reflector may be included as a part of the point light source situated adjacent to the light entry face 514.

Figure 6:
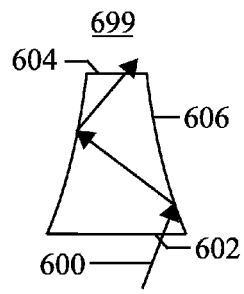
FIG. 6 illustrates a side view of a coupling block, according to an embodiment.

FIG. 6 illustrates a side view of a coupling block 699, according to an embodiment. The light guiding face 606 of the coupling block 699 is convex (as viewed from inside the coupling block 699). In other words, the light guiding face or faces are more sloped in a thicker region of the coupling block, and less sloped (more parallel to each other) in a thinner region of the coupling block. An exemplary ray of light 600 from a light source enters the light entry face 602 of coupling block 699, and gets guided by the one or more light guiding faces 606 towards the light exit face 604. In the thicker region of the coupling block, the sloped light guiding faces cause a change in the angle of the light ray, but the light ray travels a lot since the distance between the light guiding faces is more. In the thinner region of the coupling block, since the light guiding faces are more parallel, there is less change in the angle of the light ray.

Figure 7:
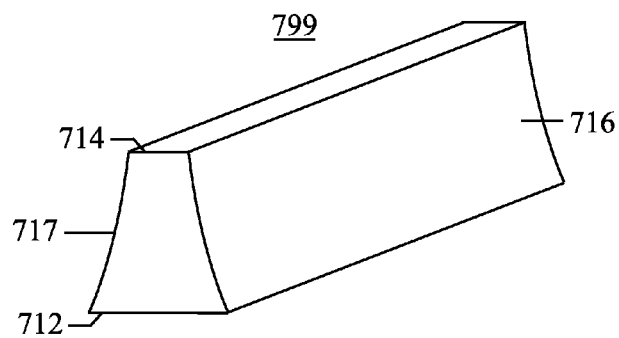
FIG. 7 illustrates a light coupling block for efficiently coupling light from a linear light source into a sheet light guide, according to an embodiment.

FIG. 7 illustrates a light coupling block 799 for efficiently coupling light from a linear light source into a sheet light guide, according to an embodiment. The light coupling block has a light entry face 712, a light exit face 714 and light guiding faces 716 and 717. The light guiding faces 716 and 717 are convex (as viewed from inside the coupling block 799).

Figure 8:
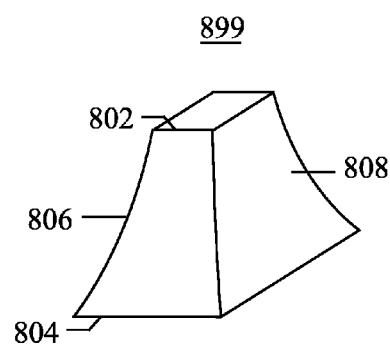
FIG. 8 illustrates a light coupling block for efficiently coupling light from a point light source into a linear light guide, according to an embodiment.

FIG. 8 illustrates a light coupling block 899 for efficiently coupling light from a point light source into a linear light guide, according to an embodiment. The light coupling block has a light entry face 804, a light exit face 802 and light guiding faces 806 and 808. The light guiding faces 806 and 808 are convex (as viewed from inside the coupling block 899).

Figure 9:
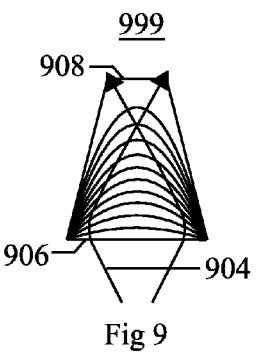
FIG. 9 illustrates a side view of a coupling block, according to an embodiment.

FIG. 9 illustrates a side view of a coupling block 999, according to an embodiment. The coupling block 999 comprises regions of different refractive indexes. In an embodiment, the coupling block 999 comprises regions with decreasing refractive indexes as the distance from the light entry face 906 increases. In another embodiment, the refractive index of the coupling block 999 decreases continuously with respect to the distance from the light entry face 906. An exemplary ray of light 904 from a light source enters the light entry face 906. It undergoes refraction at multiple interfaces formed by regions with different refractive indexes and converges towards the narrower light exit face 908.

Figure 10:
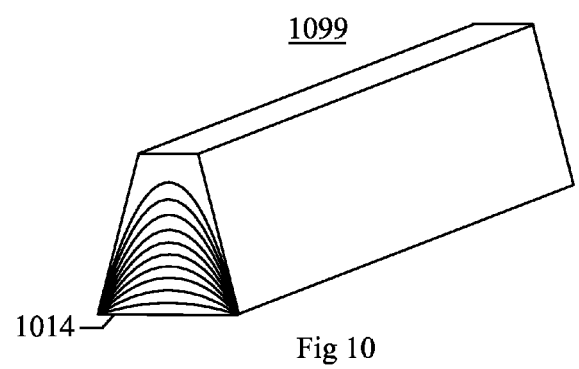
FIG. 10 illustrates a light coupling block for efficiently coupling light from a linear light source into a sheet light guide, according to an embodiment.

FIG. 10 illustrates a light coupling block 1099 for efficiently coupling light from a linear light source into a sheet light guide, according to an embodiment. In an embodiment, the light coupling block 1099 comprises regions with decreasing refractive indexes as the distance from the light entry face 1014 increases. In another embodiment, the refractive index of the light coupling block 1099 decreases continuously with respect to the distance from the light entry face 1014.

Figure 11:
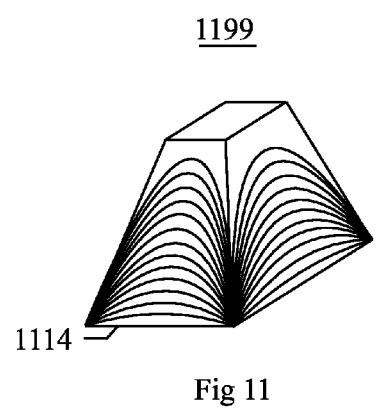
FIG. 11 illustrates a light coupling block for efficiently coupling light from a point light source into linear light guide, according to an embodiment.

FIG. 11 illustrates a light coupling block 1199 for efficiently coupling light from a point light source into linear light guide, according to an embodiment. In an embodiment, the light coupling block 1199 comprises regions with decreasing refractive indexes as the distance from the light entry face 1114 increases. In another embodiment, the refractive index of the light coupling block 1199 decreases continuously with respect to the distance from the light entry face 1114.

Figure 12:
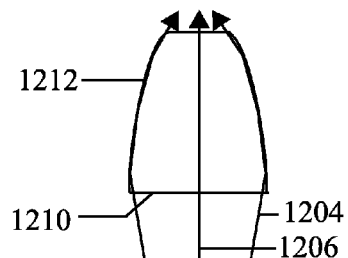
FIG. 12 illustrates a side view of a coupling block, according to an embodiment.

FIG. 12 illustrates a side view of a coupling block 1299, according to an embodiment. The light guiding face 1212 of the coupling block 1299 is concave (as viewed from inside the coupling block 1299). An exemplary light ray 1206 travels straight through the transparent body and gets coupled into a light guide. Another exemplary light ray 1204 is incident on the concave light guiding face 1212 at a very small grazing angle. The light ray 1204 undergoes total internal reflection at every point of incidence and it goes along the concave surface of the light guiding face 1212. In an embodiment, the light source adjacent to light entry face 1210 emits light in a narrow cone of directions. In this way, a predominant portion of light hitting the light guiding face 1212 will hit it at a grazing angle. Light sources emitting light in a narrow cone of directions include LASERS, and light sources augmented with directionality enhancing optics such as lenses, lens sheets, prisms or prism sheets.

Figure 13:
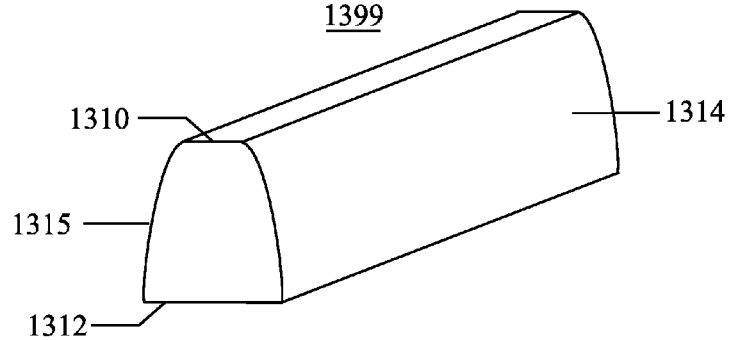
FIG. 13 illustrates a light coupling block for efficiently coupling light from a linear light source into a sheet light guide, according to an embodiment.

FIG. 13 illustrates a light coupling block 1399 for efficiently coupling light from a linear light source into a sheet light guide, according to an embodiment. The light coupling block has a light entry face 1312, a light exit face 1310 and light guiding faces 1314 and 1315. The light guiding faces 1314 and 1315 are concave (as viewed from inside the coupling block 1399).

Figure 14:
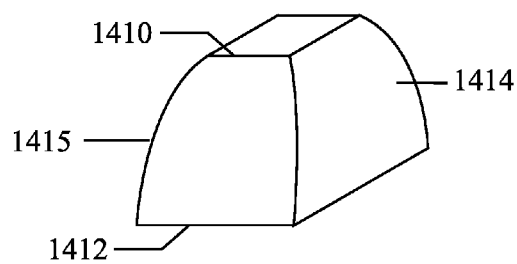
FIG. 14 illustrates a light coupling block for efficiently coupling light from a point light source into a linear light guide, according to an embodiment.

FIG. 14 illustrates a light coupling block 1499 for efficiently coupling light from a point light source into a linear light guide, according to an embodiment. The light coupling block has a light entry face 1412, a light exit face 1410 and light guiding faces 1414 and 1415. The light guiding faces 1414 and 1415 are concave (as viewed from inside the coupling block 1499).

Figure 15:
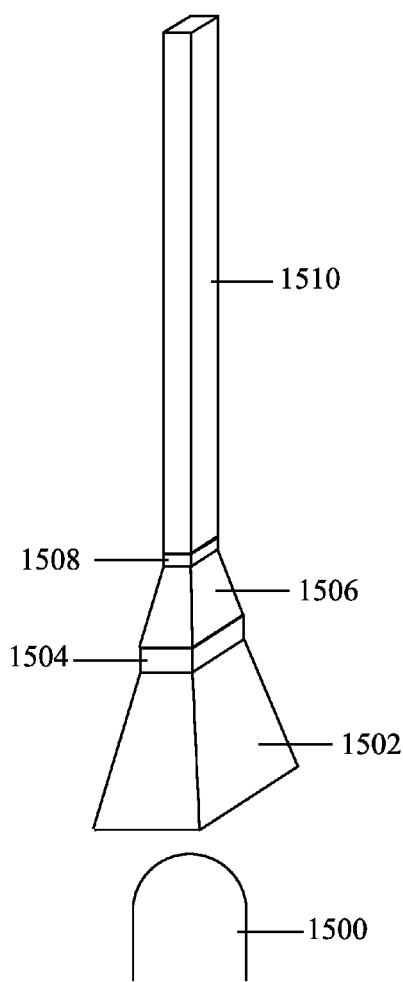
FIG. 15 illustrates an apparatus for efficiently coupling light from a light source into a light guide, according to an embodiment.

FIG. 15 illustrates an apparatus 1599 for efficiently coupling light from a light source 1500 into a light guide 1510, according to an embodiment. The apparatus 1599 comprises more than one light coupling blocks 1502 and 1506. In an embodiment, the more than one light coupling blocks are serially placed in such a way that the light exit face of one light coupling block is next to the light entry face of the adjacent coupling block. Such an arrangement of multiple light coupling blocks allows coupling into thinner light guides. In an embodiment, transparent bodies with lower refractive index such as 1504 and 1508 may be placed between coupling blocks and between the final coupling block and the light guide 1510.

Figure 16:
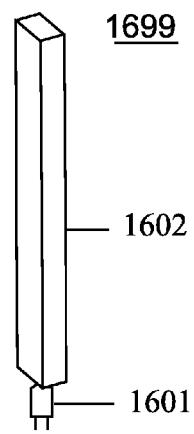
FIG. 16 illustrates a linear light source, according to one embodiment.

FIG. 16 illustrates a linear light source 1699, according to one embodiment. A point light source 1601 is placed near one end of linear light guide 1602. Linear light guide 1602 includes a light deflector such as small transparent particles or bubbles, or metallic particles, or dye or pigment, which disperse light by refraction, reflection or by scattering. Light from point light source 1601 enters the linear light guide 1602 and is guided within it by total internal reflection. This light is deflected by the light deflector, and emanates over the entire surface of linear light guide 1602, thus forming a linear light source. The concentration of light deflector particles may be uniform, or may be varied throughout the linear light guide 1602 to achieve a required light emanation pattern. If the power emanated by point light source 1601 is changed, the light emanation pattern of light source 1699 changes proportionately. If more than one point light sources are used, their power may be changed in tandem to change the light emanation pattern proportionately.

In an embodiment, the concentration of light deflector particles is chosen such that the linear light guide 1602 is transparent when viewed from its side, but translucent when viewed from an end, making the linear light source 1699 transparent to light entering from outside. Such a transparent light source will allow light exiting the light entry face of a coupling block (placed adjacent to the light source) to be sent back into the light entry face even if it hits the light source. On hitting the light source, the exiting light continues traveling through the light source.

Figure 17:
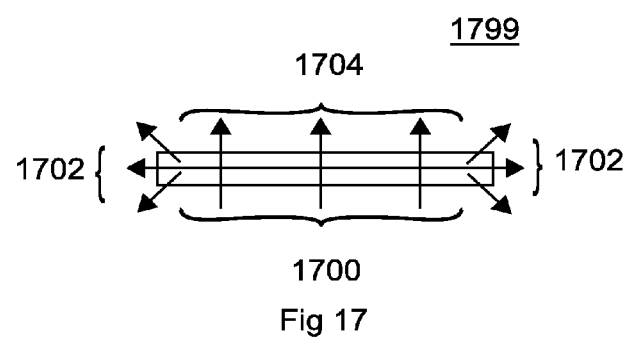
FIG. 17 illustrates an exemplary element of a light guide having light deflector, according to one embodiment.

FIG. 17 illustrates an exemplary element 1799 of a light guide having light deflector, according to one embodiment. Element 1799 is a small sliver of the light guide at a particular distance from the end of the light guide that is near a light source. It has a very small height (but the other dimensions of the light guide). The light guide of which element 1799 is an element, may be a linear light guide, forming a linear light source.

Light 1700, emanated by a light source, and guided by the light guide portion before the element 1799, enters element 1799. Some of the light gets dispersed due to light deflector included in the light guide, and leaves the light guide as illumination light 1702. The remaining light continues on to the next element as light 1704. The power of entering light 1700 is matched by the sum of the powers of illumination light 1702 and continuing light 1704. The fraction of dispersed illumination light 1702 with respect to entering light 1700 is the photic dispersivity of element 1799. The ratio of the photic dispersivity of element 1799 to the height of element 1799 is the photic dispersion density of element 1799. As the height of element 1799 decreases, the photic dispersion density (of this element) approaches a constant. This photic dispersion density of element 1799 bears a certain relationship to the concentration of light deflecting particles in the element 1799. The relationship is approximated to a certain degree as a direct proportion. By knowing the concentration of light deflecting particles of element 1799, the photic dispersion density of element 1799 may be evaluated, and vice versa.

As the height of element 1799 is reduced, power in the illumination light 1702 reduces proportionately. The ratio of power of illumination light 1702 to the height of element 1799, which approaches a constant as the height of the element is reduced, is the emanated power density at element 1799. The emanated power density at element 1799 is the photic dispersion density times the power of entering light 1700. The gradient of the power of light traveling through the element 1799 is the negative of the emanated power density. These two relations give a differential equation:

$$dP/dh = -qP = -K$$

where h is the distance of the element from the light source end of the light guide, P is the power of the light being guided through element, q is the photic dispersion density of element and K is the emanated power density at element.

This differential equation applies to all elements of the dispersing light guide. It is used to find the emanated power density given the photic dispersion density at each element. This equation is also used to find the photic dispersion density of each element, given the emanated power density. To design a light source with a particular emanated power density pattern (emanated power density as a function of distance from the light source end of the light guide), the above differential equation is solved to determine the photic dispersion density at each element of the light guide. From this, the concentration of light deflecting particles at each element of a light guide is determined.

If a uniform particle concentration is used in the light guide, the emanated power density drops exponentially with distance from the end. Uniform emanated power density may be approximated by choosing a particle concentration such that the power drop from the end near the light source to the opposite end, is minimized. To reduce the power loss and also improve the uniformity of the emanated power, the opposite end reflects light back into the light guide. In an alternate embodiment, another light source provides light into the opposite end.

Figure 18:
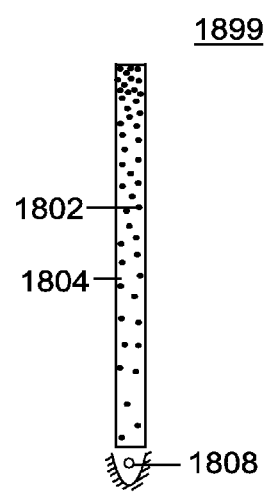
FIG. 18 illustrates an exemplary light source having a varied concentration of light deflecting particles, according to one embodiment.

FIG. 18 illustrates an exemplary linear light source 1899 having a varied concentration of light deflecting particles, according to one embodiment. The concentration of light deflecting particles 1802 is varied from sparse to dense from the light source end (near light source 1808) of light guide 1804 to the opposite end.

To achieve uniform illumination, the photic dispersion density and hence the particle concentration has to be varied over the light guide. The photic dispersion density is varied according to $$q=K/(A-hK)$$

where

A is the power going into the light guide 1804 and

K is the emanated power density at each element, a constant number (independent of h) for uniform illumination.

If the total height of the light guide 1804 is H, then H times K should be less than A, i.e. total power emanated should be less than total power going into the light guide, in which case the above solution is feasible. If the complete power going into the light guide is utilized for illumination, then H times K equals A. In an embodiment, H times K is kept only slightly less than A, so that only a little power is wasted, as well as photic dispersion density is always finite.

Figure 19:
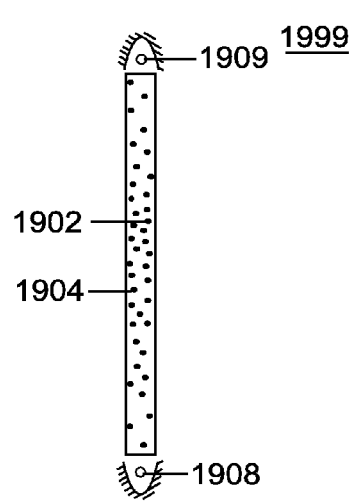
FIG. 19 illustrates an exemplary light source having two light sources, according to one embodiment.

FIG. 19 illustrates an exemplary linear light source 1999 having two light sources, according to one embodiment. By using two light sources 1908, 1909, high variations in concentration of light deflecting particles 1902 in the light guide 1904 is not necessary. The differential equation provided above is used independently for deriving the emanated power density due to each of the light sources 1908, 1909. The addition of these two power densities provides the total light power density emanated at a particular light guide element.

Uniform illumination for light source 1999 is achieved by varying photic dispersion density according to $$q=1/\text{sqrt}((h-H/2)^2+C/K^2)$$

where sqrt is the square root function,

^ stands for exponentiation, and

C=A (A−HK).

Figure 20:
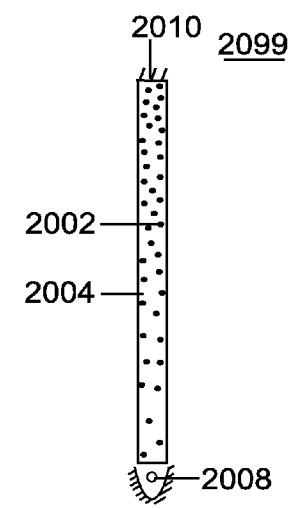
FIG. 20 illustrates an exemplary light source having a mirrored light guide, according to one embodiment.

FIG. 20 illustrates an exemplary linear light source 2099 having a mirrored light guide, according to one embodiment. By using a mirrored light guide 2004, high variations in concentration of light deflecting particles 2002 is not necessary. Top end 2010 of the light guide 2004 is mirrored, such that it reflects light back into the light guide 2004.

Uniform illumination for light source 2099 is achieved by varying photic dispersion density according to $$q=1/\text{sqrt}((h-H)^2+D/K^2)$$

where D=4A (A−HK).

An apparatus for efficiently coupling light from a light source into a thin object such as a rod or a sheet is disclosed. It is understood that the embodiments described herein are for the purpose of elucidation and should not be considered limiting the subject matter of the present patent. Various modifications, uses, substitutions, recombinations, improvements, methods of production without departing from the scope or spirit of the present invention would be evident to a person skilled in the art.

The invention claimed is:

1. An apparatus comprising: a light source, a light coupling block, and a thin light guide, wherein
    the light coupling block comprises a transparent body with a larger light entry face than a light exit face and regions of different refractive indexes, and
    the light source, the light coupling block and the thin light guide are arranged such that light from the light source enters the light entry face of the light coupling block and light exiting the light exit face of the light coupling block enters the thin light guide.

2. The apparatus of claim 1, wherein the refractive indexes of the regions decrease as the distance from the light entry face increases.

3. The apparatus of claim 1, wherein the light coupling block has a continuously decreasing refractive index with respect to the distance from the light entry face.

4. An apparatus comprising: a light source, a light coupling block, a transparent body, and a thin light guide, wherein
    the light coupling block has a light entry face and a light exit face,
    the light source, the light coupling block, the transparent body and the thin light guide are arranged such that light from the light source enters the light entry face of the light coupling block, light exiting the light exit face of the light coupling block enters the thin light guide, and the transparent body is situated between the light exit face and the thin light guide, and
    the refractive index of the transparent body is lower than the refractive index of the thin light guide.

5. The apparatus of claim 4, wherein the refractive index of the transparent body is lower than the refractive index of the coupling block.

6. The apparatus of claim 4, wherein the transparent body has a reflector on the outside.

7. An apparatus comprising: a light source, at least two light coupling blocks, and a thin light guide, wherein
    each of the at least two light coupling blocks comprise a transparent body with a larger light entry face than a light exit face, and
    the light source, the at least two light coupling blocks and the thin light guide are serially arranged such that
        the light exit face of one light coupling block is next to the light entry of the adjacent light coupling block, and
        light from the light source enters the light entry face of one light coupling block and light exiting the light exit face of another light coupling block enters the thin light guide.

8. The apparatus of claim 7, further comprising at least two transparent bodies situated in between different light coupling blocks or in between a light coupling block and the thin light guide.

* * * * *